United States Patent [19]
De Zurik

[11] 4,014,286
[45] Mar. 29, 1977

[54] HOT PRODUCT MARKING SYSTEM

[76] Inventor: Donald E. De Zurik, 17325 N. 25th Ave., Wayzata, Minn. 55391

[22] Filed: Apr. 25, 1975

[21] Appl. No.: 571,631

[52] U.S. Cl. .................................. 118/2; 118/8; 118/312
[51] Int. Cl.² ............................... B05C 19/00
[58] Field of Search ............... 118/2, 9, 309, 312, 118/308, 316, 301, 8, 326

[56] References Cited
UNITED STATES PATENTS

| | | | |
|---|---|---|---|
| 3,290,167 | 12/1966 | Wood et al. | 118/9 X |
| 3,572,290 | 3/1971 | Christiansen | 118/312 X |
| 3,592,676 | 7/1971 | Frum, Jr., et al. | 118/309 X |
| 3,603,287 | 9/1971 | Christy et al. | 118/309 |
| 3,724,416 | 4/1973 | Diamond et al. | 118/312 X |
| 3,741,155 | 6/1973 | Hunder | 118/309 X |

*Primary Examiner*—John P. McIntosh
*Attorney, Agent, or Firm*—Burd, Braddock & Bartz

[57] ABSTRACT

An apparatus for depositing an adherent thermoplastic or thermo-settable powdered marking material on hot products, such as hot steel during the rolling process for identification purposes. The system includes one or more fixed spray guns disposed adjacent to the product flow path from a previous processing operation, such as a rolling mill, for depositing marking powder from a supply source as the product passes. Manually operated or automatic sensing devices trigger the operation of the marking device. An exhaust system removes excess marking powder from the application area for reclaiming.

10 Claims, 5 Drawing Figures

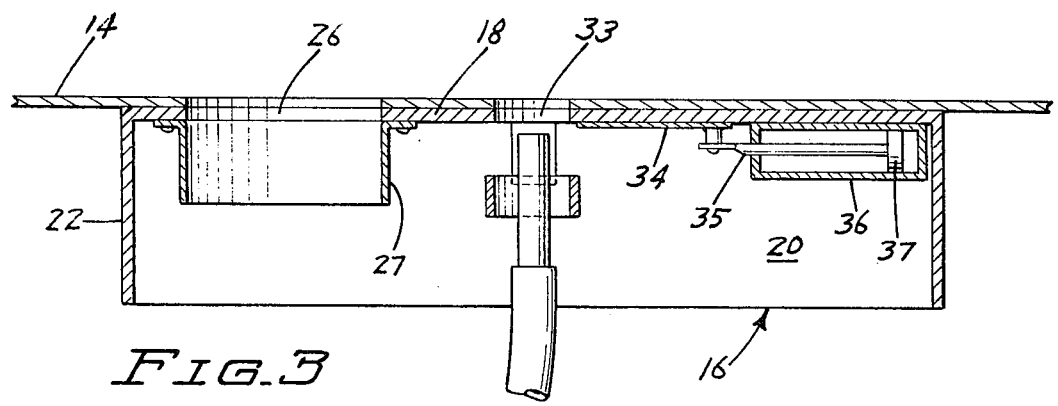
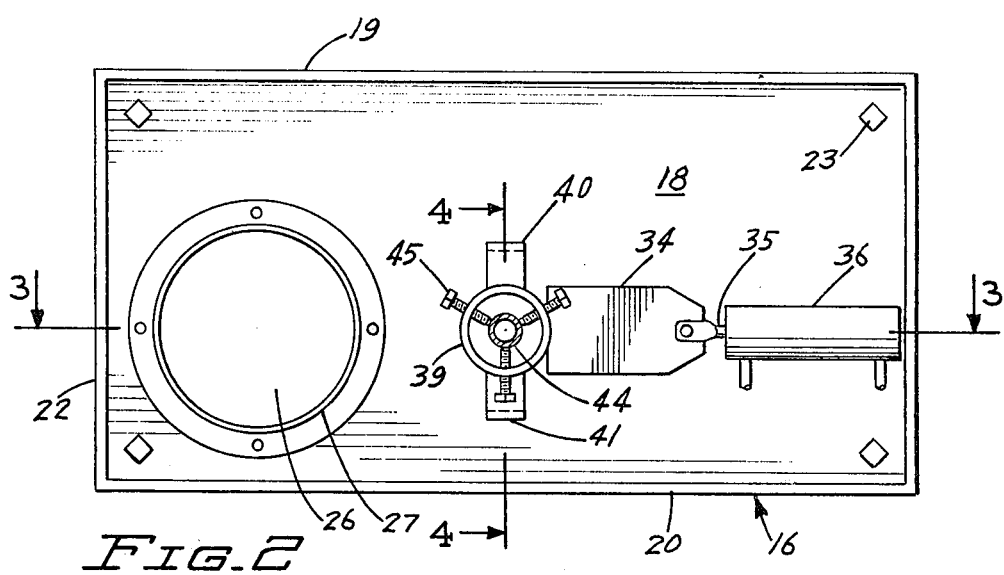
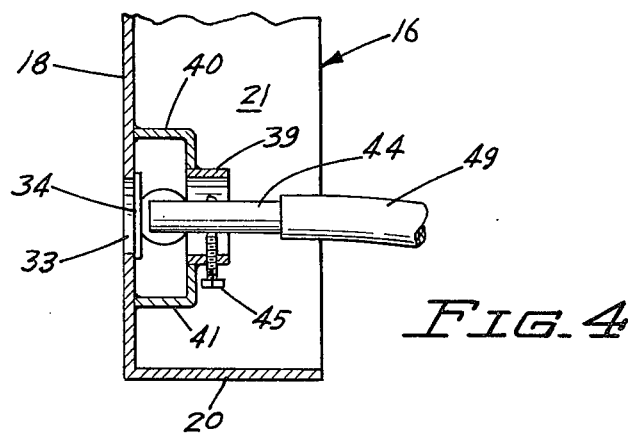

HOT PRODUCT MARKING SYSTEM

This invention relates to a system for marking hot product, such as hot metals, steel, aluminum, etc., hot asbestos products and the like, for identification purposes as the product passes from a previous processing operation, such as when it emerges from the rolling mill during the rolling process. There are various reasons for marking products, such as steel, for identification. For example, it is desirable to identify products of different composition, to identify custom orders for particular purchasers, to readily identify different sizes of product, and the like. This is one of the greatest problems in the steel industry today. Current steel mill practice is for workmen called "heat chasers" to physically follow the product during rolling and manually attach identification means. This is subject to a number of disadvantages, being expensive, often inaccurate, and subject to human error and limitations. Although extensive research has been conducted in the industry, a successful marking system has not previously been available.

Broadly stated, the system according to the present invention comprises one or more powder applicators disposed adjacent to the flow path of hot products from a previous operation coupled to a supply of marking material and manually operated or automatically activated and deactivated by sensing means capable of detecting the presence of a product in the marking zone. The invention also includes an exhaust and reclamation system for removing and recovering excess marking powder.

The invention is illustrated in the accompanying drawings in which:

FIG. 2 is an elevation showing the marking and powder exhaust station of the system;

FIG. 3 is a horizontal section thereof taken on the line 3—3 of FIG. 2;

FIG. 4 is a fragmentary vertical section on the line 4—4 of FIG. 2; and

Figure 1:
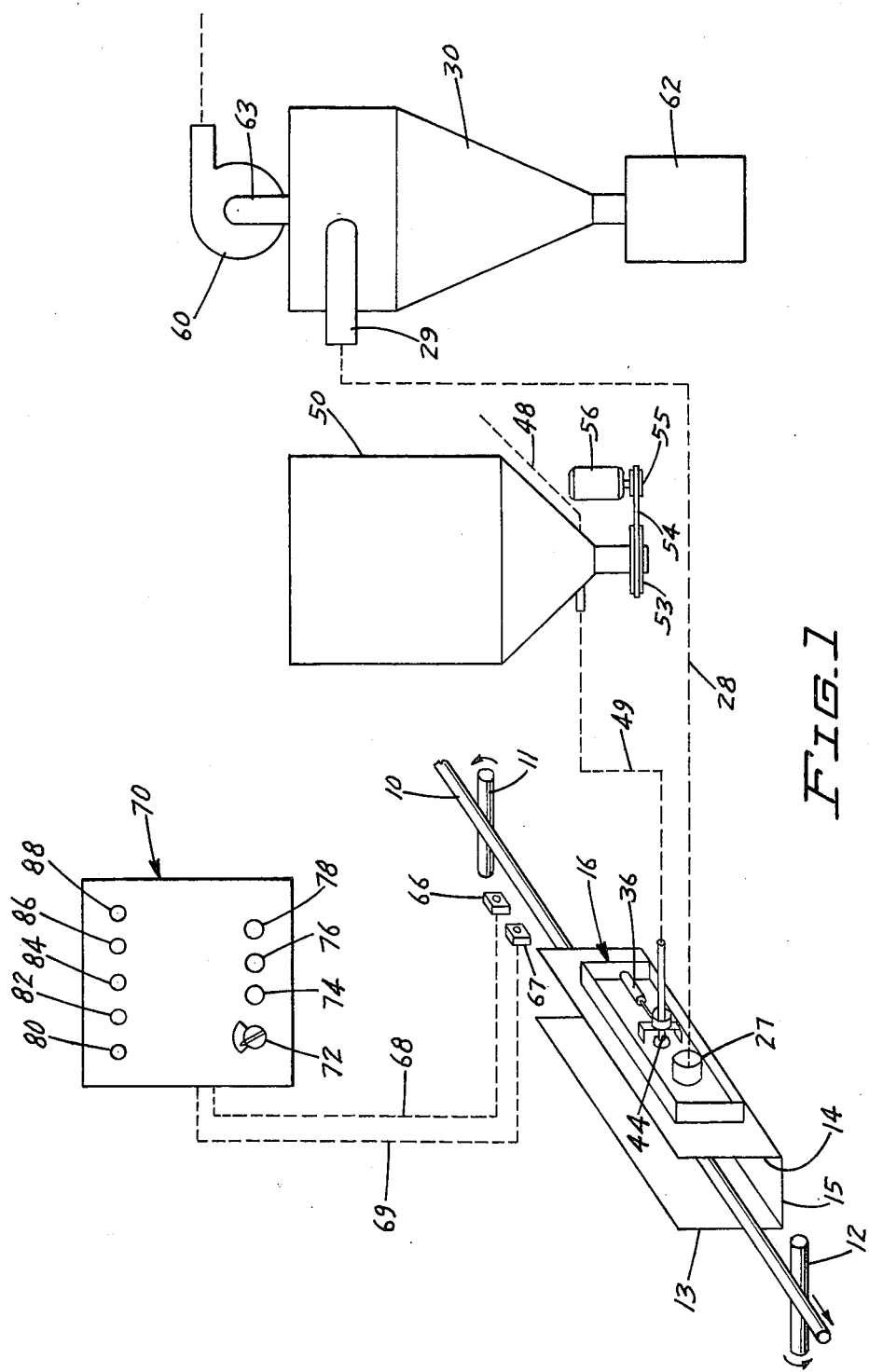
FIG. 1 is a schematic representation of the overall hot product marking system according to the present invention.

Referring now to the drawings, and particularly to FIG. 1, although the invention is of broader application, it is for convenience described with particular reference to marking of hot steel and there is shown a hot steel rolled product 10, which may be of any of a variety of shapes and sizes, as it emerges from the exit of a rolling mill supported on a plurality of transport rolls 11 and 12. The product passes through a trough-like conveyor composed of a pair of closely spaced apart generally parallel vertical plates 13 and 14 and horizontal bottom plate 15.

A marking station, indicated generally at 16, is mounted on one of the plates 13 if the product is to be marked on one side only, or a marking station is mounted on both plates if both sides of the product are to be marked. As best seen in FIGS. 2 through 4, marking station 16 is an open box-like structure comprising a vertical wall 18 from the edges of which horizontal top and bottom plates 19 and 20 and vertical end plates 20 and 21 extend at approximately right angles. The marking station is mounted on the conveyor plate by a plurality of bolts 23 or equivalent fastening means. As shown, the flow path of product 10 through the marking zone is unobstructed at both ends, and is unobstructed at the top as shown.

Back plate 18 is provided with a hole 16 adjacent its downstream end over which is fastened a male duct flange 27 for connection of one end of a duct 29 whose other end is connected to the inlet 29 to a cyclone separator 30 or similar gas-solid separating means. Upstream from the exhaust duct, pate 18 is provided with a somewhat smaller aperture 33. Corresponding apertures are formed in the conveyor wall. A reciprocating door 34 is supported from the piston rod 35 of an air cylinder 36 mounted in the marking station. Air is admitted to one side or the other of piston 37 to open or close the door. Door 34 is slideable along the face of plate 18 into either of two positions to cover hole 33 completely or to uncover that opening completely.

A spray gun mounting ring 39 is supported in front of opening 33 spaced therefrom by a bifurcated bracket whose legs 40 and 41 are secured, as by welding, to the back plate above and below the opening. Bracket legs 40 and 41 are sufficiently spaced apart to provide clearance for sliding door 34. The spray gun nozzle 44 is secured within the mounting ring by a plurality of set screws 45 with the tip of the nozzle spaced from the opening sufficient to permit sliding of door 34. Alternatively, the marking stations may incorporate an open ended housing surrounding the product flow path, or other means of locating spray guns adjacent to the flow path.

One end of a hose or tubing 48 is connected to a source (not shown) of gas under pressure, such as an air compressor, air pump or storage tank. Hose 48 connects to a venturi located adjacent the discharge of a feed hopper, such as conical gravity flow powder feed hopper 50, to aspirate or otherwise propel powder from the hopper and convey it by means of tube or hose 49 to the spray gun 44. Feed hopper 50 is fitted with agitating means being of the type having a rotatable agitator whose drive wheel 53 is connected by belt 54 to the drive wheel 55 of electric motor 56, or having a fluidized bed or having vibrators, or the like. This insures non-clogging feeding of powder to the gun. The powder hopper desirably is of a size to contain a large quantity of powder and is equipped with a hinged cover for adding material without interrupting production. The air supply is desirably dried and filtered before introduction to the feed supply to avoid formation of clots or lumps or other contamination of the powder.

The cyclone 30 or similar separator is of conventional design. Fan 60 desirably is of such capacity as to apply sufficient suction to duct 28 to exhaust excess spray powder from the marking zone, although auxiliary fan means may be used if desired or necessary. The dispersion of excess spray powder enters inlet 29. A large percentage, i.e., about 85 to 95 percent, of the excess powder is separated from the air and passes through the bottom of the separator to a storage housing 62 from which the powder may be withdrawn and recycled. Any fines not separated in the cyclone are drawn off through the top duct 63 of the cyclone and passed to a bag house or similar after-filter means.

Figure 5:
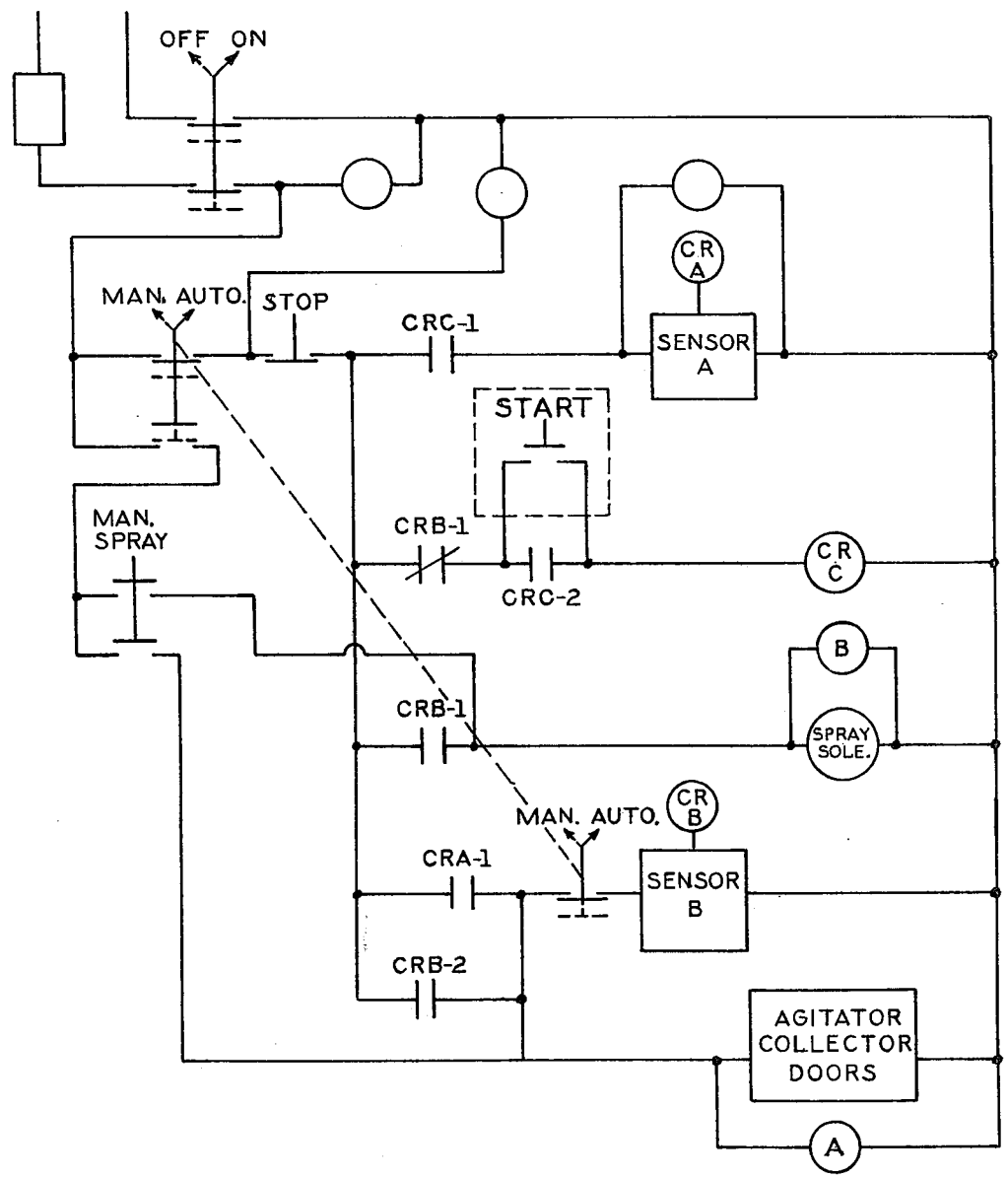
FIG. 5 is a schematic circuit diagram showing one form of automatic control means for the system.

A pair of infra-red sensors 66 and 67 or other sensing means such as photoelectric cells, magnetic sensors, fluidic sensors, eddy current sensors, computer or other signal, and the like, are positioned spaced apart in close proximity to the flow path of the product to detect the presence of the product in order to activate and deactivate the marking system. The photocell sensors are connected by appropriate electrical conductors to a remote control panel 70, the circuitry of which is generally as shown in FIG. 5. The powdered marking material may be a thermoplastic or thermo-settable resinous material. It must be non-volatile at the temperature range of the hot product, in the case of steel, between about 1100° to 2000° F. It must fuse and bond to the hot product so as to be tightly adherent and must remain adherent without any appreciable flaking or powdering after the steel has cooled. It should be pigmented or otherwise colored so that after cooling it presents a color in sharp contrast to that of the cold steel for ready identification of the product. Exemplary material which may be used for this purpose include, for example, Markal No. 103 and No. 113 Thermal Powder (Markal Company, Chicago), talc or lime. In general, those materials used to make hot product marking crayons, in finely divided powder form, may be used.

The following is typical of the operation of the marking system according to the present invention, as will be understood by reference to FIG. 5. A plurality of unmarked products in sequence are being ejected from the rolling mill. To initiate marking, the electricity is on and the manual-automatic switch 72 is in automatic position. The unmarked products are viewed by infrared sensor A (66). When the product to be marked enters the rolling mill, the operator pushes the start button 74 to depress it momentarily. Control relay CRC is energized, sealing contacts CRC-2 hold CRC closed and sensor A is turned on. Since the unmarked products are viewed by sensor A, its relay CRA remains deenergized until the end of the last unmarked product is sensed (dark sense or loss of sense). Then CRA is energized closing CRA-1, turning infra-red sensor B (67) on, and turning on the motor of the cyclone fan 60, agitator motor 56 and actuating the solenoid controlling admission of air to cylinder 36 to open the nozzle door 34.

When sensor B senses the presence of the first product to be marked (light sense), relay CRB is energized. CRB-1 drops out CRC which turns off sensor A. Sealing contacts CRB-2 hold sensor B on. At the same time, CRB-1 normally open contacts close to actuate the solenoid controlling flow of air to the feed hopper and spray gun to operate the spray. Spraying continues as stock continues to pass by the marking zone. Mere cutoffs to length do not stop the spraying operation. When sensor B detects the passing of the last marked billet (absence of product), CRB drops out after a half-second time delay turning off sensor B, stopping the spray, turning off collector motor 60 and agitator motor 56, closing the nozzle door and resetting the control circuit to await restarting.

The control circuit includes a number of safety and interlock features. A manual stop button 76 is provided to stop the spray, the collector fan and agitator motor, close the nozzle door, and reset the control circuit. Manual and override switches 72, 78 are provided to turn on the collector fan, operate the spray, turn on the agitator motor, and open the nozzle doors. Indicator lights are provided on the control panel as follows. Light 80 (desirably green) shows when the system is "on". Light 82 (also desirably green) shows when the system is on automatic control. Light 84 (desirably yellow) shows when the collector and agitator are on and the nozzle door is open. Light 86 (desirably yellow) shows when the spray is on. Light 88 (also desirably yellow) shows when the automatic system is enabled and will turn off when the last product being marked leaves the marking station.

Depending upon particular plant requirements, the system according to the present invention may be operated either manually or automatically. It may be used to mark and identify every piece of rolled product; to mark particular pieces only, such as the first and last of a run; to identify defects only, or the like. It may be used to mark either or both sides, or to apply several colors or types of material from multiple spray stations using the common control system.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. An apparatus for marking hot elongated longitudinally traversing rolled metal products of varying sizes for identification as said products emerge from a previous hot processing operation, said apparatus comprising:
   A. a marking station immediately adjacent to the flow path of hot metal traveling from a previous hot processing operation, said marking station being disposed downstream from said previous operation and including:
      1. wall means partially enclosing the sides of said flow path, the resulting partial enclosure being open at the ends and substantially unobstructed at the top,
      2. spray means directed through said wall means at said flow path, and
      3. an exhaust duct through said wall means,
   B. a supply vessel adapted to contain a quantity of thermo-sensitive powdered marking material, said vessel including powder propelling means,
   C. means for connecting said propelling means to a source of gas under pressure,
   D. means for connecting said spray means to said supply vessel,
   E. suction means for withdrawing excess marking material connected to said exhaust duct, and
   F. sensor actuated automatic control means to operate said spray means and exhaust means upon demand, including sensor means disposed adjacent to said flow path upstream from said marking station and operatively connected to control means to intermittently operate said spray means and suction means.

2. Apparatus according to claim 1 further characterized in that:
   A. said marking station comprises a pair of parallel vertical plates closely spaced apart on opposite sides of said flow path,
   B. at least one of said plates has an aperture therein,
   C. said spray means is positioned to spray through said aperture, and
   D. said exhaust duct extends through at least one of said plates downstream from said spray means.

3. Apparatus according to claim 2 further characterized in that:

A. said spray means includes a pneumatic spray nozzle spaced outwardly from said aperture,
B. reciprocating door means are provided between said aperture and tip of said spray nozzle to close said aperture when the spray means is inoperative, and
C. cylinder and piston means to reciprocate said door.

4. Apparatus according to claim 1 further characterized in that:
A. said supply vessel comprises a hopper provided with agitation means and located spaced from said marking station, and
B. said supply vessel and spray nozzle are connected by tubing for passage of air and powder.

5. Apparatus according to claim 1 further characterized in that said suction means comprises an exhaust fan and air-solids separator for recovery of excess marking material.

6. Apparatus according to claim 1 further characterized in that said control means comprise relay actuated switch means responsive to said sensors to actuate said spray means and suction means on demand.

7. Apparatus according to claim 1 further characterized in that said marking station includes at least a pair of spray nozzles positioned on and directed toward both opposite sides of said flow path.

8. An apparatus for marking hot elongated longitudinally traversing rolled steel products of varying sizes for identification as said products emerge from the rolling mill, said apparatus comprising:
A. a marking station immediately adjacent to the flow path of hot steel traveling from a rolling mill, said marking station being disposed downstream from said rolling mill and including:
1. wall means partially enclosing the sides of said flow path, the resulting partial enclosure being open at the ends and substantially unobstructed at the top,
2. at least one pneumatic spray nozzle directed through said wall means at said flow path, and
3. an exhaust duct through said wall means downstream from said spray nozzle,
B. a supply hopper spaced from said marking station adapted to contain a quantity of thermo-sensitive powdered marking material, and including powder propelling means,
C. tubular conduit means for connecting said propelling means to a source of gas under pressure,
D. tubular conduit means for connecting said spray nozzle to said supply hopper,
E. suction means for withdrawing excess marking material comprising:
1. an exhaust fan,
2. an air solids separator for recovery of excess marking material, and
3. tubular conduit means connecting to said exhaust duct,
F. sensors disposed adjacent said flow path upstream from said marking station to detect the presence of product therein, and
G. automatic control means responsive to said sensors to intermittently actuate said spray means and exhaust means on demand.

9. Apparatus according to claim 8 further characterized in that said marking station includes a pair of spray nozzles positioned on and directed toward both opposite sides of said flow path.

10. Apparatus according to claim 8 further characterized in that:
A. said marking station includes:
1. at least a pair of parallel vertical plates closely spaced apart on opposite sides of said flow path,
2. an aperture in at least one of said plates,
3. said spray nozzle spaced outwardly from said aperture and directed at said flow path,
4. reciprocating door means between said aperture and tip of said spray nozzle, and
5. said exhaust duct extending through at least one of said plates,
B. said reciprocating door means is mounted on the piston of an air cylinder and movable to close said aperture when said spray nozzle is inoperative,
C. said air cylinder is actuated with said spray nozzle, and
D. said supply hopper includes agitation means.

* * * * *

UNITED STATES PATENT AND TRADEMARK OFFICE
CERTIFICATE OF CORRECTION

PATENT NO. : 4,014,286
DATED : March 29, 1977
INVENTOR(S) : Donald E. De Zurik

It is certified that error appears in the above-identified patent and that said Letters Patent are hereby corrected as shown below:

Column 2, line 4, "16" should be --26--.

Signed and Sealed this

Thirty-first Day of May 1977

[SEAL]

Attest:

RUTH C. MASON
*Attesting Officer*

C. MARSHALL DANN
*Commissioner of Patents and Trademarks*